(12) United States Patent
Graves et al.

(10) Patent No.: US 12,398,797 B2
(45) Date of Patent: *Aug. 26, 2025

(54) ELECTRIC DRIVE UNIT COOLING SYSTEMS WITH ANNULAR OIL DISTRIBUTION ASSEMBLY AND METHODS

(71) Applicant: Tesla, Inc., Austin, TX (US)

(72) Inventors: Scott Michael Graves, Felton, CA (US); Eric Bellemare, Mountain View, CA (US); Alexander Hain, Frankfurt Höchst (DE)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,402

(22) Filed: Sep. 16, 2021

(65) Prior Publication Data

US 2022/0003306 A1    Jan. 6, 2022

Related U.S. Application Data

(63) Continuation of application No. 15/944,990, filed on Apr. 4, 2018, now Pat. No. 11,125,315.

(Continued)

(51) Int. Cl.
*F16H 57/04* (2010.01)
*B60K 1/00* (2006.01)
(Continued)

(52) U.S. Cl.
CPC ........... *F16H 57/0409* (2013.01); *B60K 1/00* (2013.01); *B60K 17/043* (2013.01);
(Continued)

(58) Field of Classification Search
CPC ............ F16H 57/0409; F16H 57/0402; F16H 57/0412; F16H 57/0423; F16H 57/0424;
(Continued)

(56) References Cited

U.S. PATENT DOCUMENTS 3,531,668 A * 9/1970 Cathey ................. G01R 31/343
                                                            310/58
4,269,295 A 5/1981 Kish
(Continued)

FOREIGN PATENT DOCUMENTS

CN 203831276 9/2014
DE 102008061275 9/2009
(Continued)

*Primary Examiner* — Tulsidas C Patel
*Assistant Examiner* — Robert E Mates
(74) *Attorney, Agent, or Firm* — Knobbe, Martens, Olson & Bear, LLP

(57) ABSTRACT

Systems and methods for cooling power transmission systems are include providing oil through an aperture defined in a housing to a stator cooling ring, through the stator cooling ring and into stator cooling channels, through the stator cooling channels and into spaces defined between the housing and jet rings, and through holes in the jet rings and onto the end-windings. The stator cooling ring, stator cooling channels and jet rings can encircle the stator and end-windings and, via the holes in the jet rings, spray pressurized jets of oil from various angles onto the end-windings, and in particular middle regions thereof. Seals may be used between the jet rings and housing, and between the jet rings and stator ends. The seals may be compressed so as to form an interference fit between the jet rings and housing or stator ends as the case may be.

23 Claims, 10 Drawing Sheets

Related U.S. Application Data

(60) Provisional application No. 62/527,921, filed on Jun. 30, 2017.

(51) Int. Cl.

| | |
|---|---|
| *B60K 17/04* | (2006.01) |
| *F16C 25/08* | (2006.01) |
| *H02K 1/20* | (2006.01) |
| *H02K 5/20* | (2006.01) |
| *H02K 7/00* | (2006.01) |
| *H02K 7/04* | (2006.01) |
| *H02K 7/08* | (2006.01) |
| *H02K 7/116* | (2006.01) |
| *H02K 9/193* | (2006.01) |
| *H02K 15/165* | (2025.01) |
| *B60K 1/02* | (2006.01) |
| *F16H 57/02* | (2012.01) |
| *F16H 57/032* | (2012.01) |
| *F16H 57/037* | (2012.01) |
| *H02K 9/19* | (2006.01) |

(52) U.S. Cl.
CPC ....... *F16C 25/083* (2013.01); *F16H 57/0402* (2013.01); *F16H 57/0412* (2013.01); *F16H 57/0423* (2013.01); *F16H 57/0424* (2013.01); *F16H 57/0427* (2013.01); *F16H 57/0436* (2013.01); *F16H 57/0457* (2013.01); *F16H 57/046* (2013.01); *F16H 57/0471* (2013.01); *F16H 57/0482* (2013.01); *F16H 57/0483* (2013.01); *H02K 1/20* (2013.01); *H02K 5/20* (2013.01); *H02K 5/203* (2021.01); *H02K 7/003* (2013.01); *H02K 7/04* (2013.01); *H02K 7/083* (2013.01); *H02K 7/116* (2013.01); *H02K 9/193* (2013.01); *H02K 15/165* (2013.01); *B60K 2001/001* (2013.01); *B60K 1/02* (2013.01); *B60K 17/04* (2013.01); *B60Y 2200/91* (2013.01); *B60Y 2306/03* (2013.01); *B60Y 2306/05* (2013.01); *B60Y 2410/1022* (2013.01); *F16C 2326/06* (2013.01); *F16H 2057/02034* (2013.01); *F16H 2057/0325* (2013.01); *F16H 57/037* (2013.01); *H02K 7/006* (2013.01); *H02K 9/19* (2013.01)

(58) Field of Classification Search
CPC ...... F16H 57/0427; H02K 5/20; H02K 9/193; H02K 9/197; H02K 7/006; H02K 1/20
USPC .......................................................... 310/54
See application file for complete search history.

(56) References Cited

U.S. PATENT DOCUMENTS

| | | |
|---|---|---|
| 4,607,180 A | 8/1986 | Stoody |
| 5,251,725 A | 10/1993 | Barrett, Jr. |
| 5,899,574 A | 5/1999 | Chujo |
| 6,123,338 A | 9/2000 | Edelmann |
| 6,158,898 A | 12/2000 | Jeng |
| 6,507,134 B1 | 1/2003 | Severien |
| 6,938,731 B2 | 9/2005 | Slesinski |
| 7,374,507 B2 | 5/2008 | Corless |
| 8,950,531 B2 | 2/2015 | Urabe |
| 9,052,009 B2 | 6/2015 | Barillot |
| 9,810,311 B1 | 11/2017 | Zhang |
| 9,816,602 B2 | 11/2017 | Beisel et al. |
| 9,822,869 B1 | 11/2017 | Carr |
| 10,208,848 B2 | 2/2019 | Hotait |
| 10,510,195 B2 | 12/2019 | Patil et al. |
| 10,781,909 B2 | 9/2020 | Graves et al. |
| 10,801,606 B2 | 10/2020 | Dellal |
| 10,808,827 B2 | 10/2020 | Graves et al. |
| 11,125,315 B2 | 9/2021 | Graves et al. |
| 2004/0130224 A1 | 7/2004 | Magi |
| 2004/0134693 A1 | 7/2004 | Yamagishi |
| 2005/0045393 A1 | 3/2005 | Mizutani |
| 2006/0062505 A1 | 3/2006 | Hoefs |
| 2007/0200439 A1* | 8/2007 | Nagahashi ............... F01M 1/08 310/52 |
| 2009/0102298 A1 | 4/2009 | Savant |
| 2009/0127954 A1 | 5/2009 | Mogi |
| 2009/0212649 A1* | 8/2009 | Kingman ............... H02K 5/203 310/91 |
| 2010/0187954 A1 | 7/2010 | Kendall |
| 2011/0234029 A1* | 9/2011 | Pal ............ H02K 1/20 310/54 |
| 2012/0096968 A1 | 4/2012 | Kawamoto |
| 2013/0293040 A1 | 11/2013 | Chamberlin |
| 2014/0027238 A1 | 1/2014 | Schlaufman |
| 2014/0056733 A1 | 2/2014 | Ojima |
| 2014/0147306 A1 | 5/2014 | Yamashita |
| 2014/0284183 A1 | 9/2014 | Wolters |
| 2014/0364263 A1 | 12/2014 | Tokunaga |
| 2015/0082929 A1 | 3/2015 | Lsomura |
| 2016/0294231 A1* | 10/2016 | Andres ............ H02K 5/18 |
| 2016/0311306 A1 | 10/2016 | Sugiyama |
| 2017/0096058 A1 | 4/2017 | Kanada |
| 2018/0259060 A1 | 9/2018 | Poster |
| 2018/0278126 A1 | 9/2018 | Goldstein |
| 2019/0003572 A1 | 1/2019 | Dellal |
| 2019/0006923 A1 | 1/2019 | Dellal et al. |
| 2019/0267869 A1 | 8/2019 | Soma |
| 2021/0018087 A1 | 1/2021 | Dellal |

FOREIGN PATENT DOCUMENTS

| | | |
|---|---|---|
| GB | 162552 | 5/1921 |
| GB | 1426352 | 2/1976 |
| WO | WO 2016/204670 | 12/2016 |

\* cited by examiner

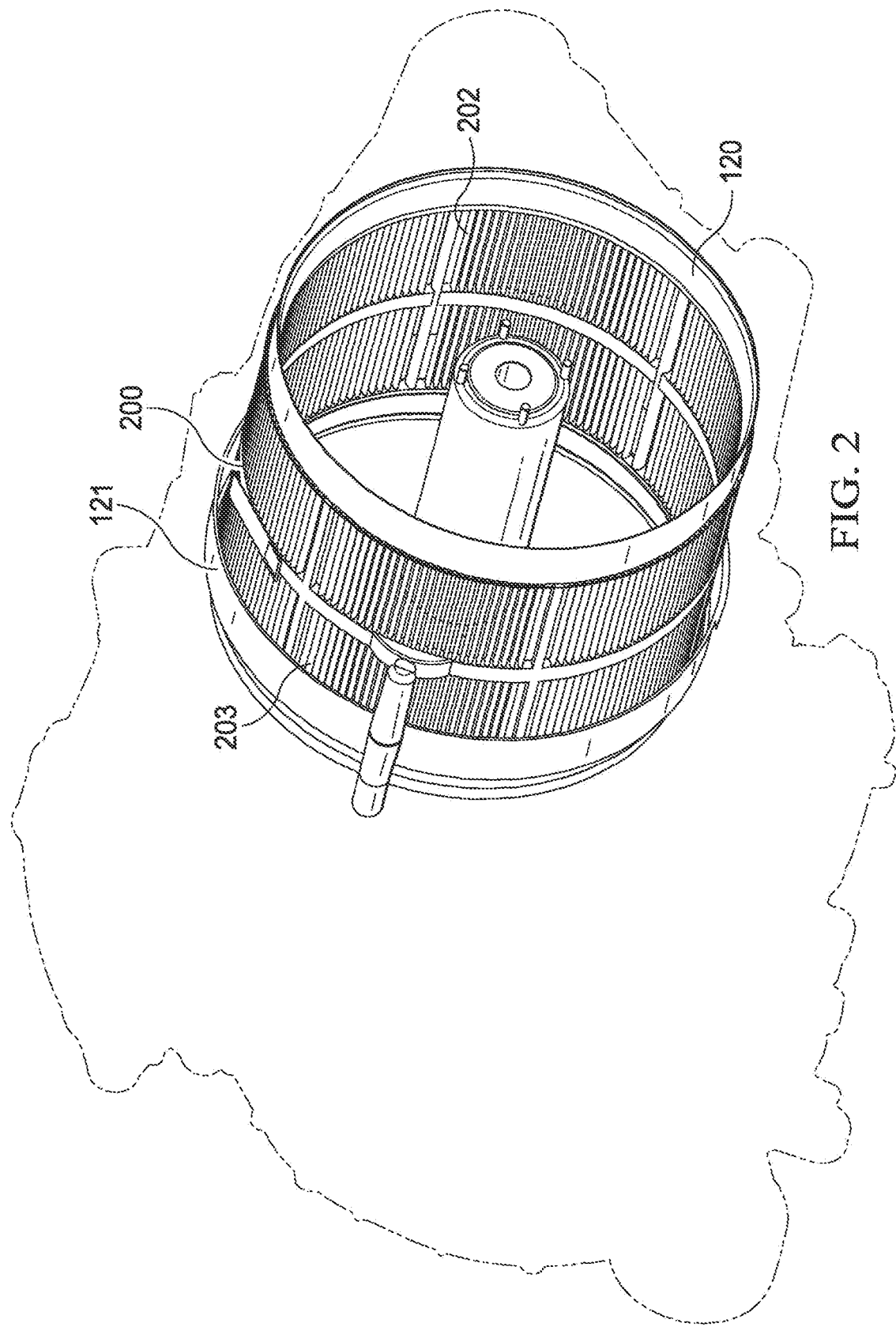

ELECTRIC DRIVE UNIT COOLING SYSTEMS WITH ANNULAR OIL DISTRIBUTION ASSEMBLY AND METHODS

CROSS-REFERENCE TO RELATED APPLICATION

The present U.S. Utility patent application is a continuation of U.S. application Ser. No. 15/944,990, filed Apr. 4, 2018, entitled "ELECTRIC DRIVE UNIT COOLING SYSTEMS AND METHODS", and issued as U.S. Pat. No. 11,125,315 on Sep. 21, 2021, which claims priority pursuant to 35 U.S.C. § 119(e) to U.S. Provisional Application No. 62/527,921, entitled "ELECTRIC DRIVE UNIT", filed Jun. 30, 2017, each of which are hereby incorporated herein by reference in their entirety and made part of the present U.S. patent application for all purposes.

The present application is related to U.S. Utility patent application Ser. No. 15/637,313, entitled "SYSTEM AND METHOD FOR MONITORING STRESS CYCLES," filed Jun. 29, 2017, which is incorporated by reference in its entirety.

BACKGROUND

Technical Field

The present disclosure relates to power transmission device cooling and lubrication, and more particularly to cooling stator end-windings.

Description of the Related Art

In electric drive units and, more generally, power transmission devices, lubrication and cooling of components is important. Failure to adequately dissipate heat and lubricate parts decreases system efficiency, performance and life span. For example, efficiency reduction of an electric drive unit or power transmission device translates into a loss of vehicle range, or an increase in system weight and system cost, for instance, if one were to compensate for the decreased range by including additional batteries. Consideration must also be given to the design of cooling and lubrication parts for manufacturing and assembly purposes, bearing in mind variations in the arrangement of cooperating components from one system to the next.

A need exists, therefore, for improved apparatuses and approaches for cooling of electric drive units and other power transmission devices.

SUMMARY

Thus, in order to overcome the shortcomings of the prior devices, among other shortcomings, an electric drive unit according to a first embodiment of the present disclosure includes a housing, a stator within the housing, at least one stator cooling ring, first and second jet rings, a first plurality of stator cooling channels, and a second plurality of stator cooling channels. The stator defines an outer side surface and includes first stator end-windings and second stator end-windings. The at least one stator cooling ring at least partially encircles the outer side surface of the stator. The first jet ring is adjacent to, and at least partially encircling the first stator end-windings and defining a first plurality of holes therein. The second jet ring is adjacent to, and at least partially encircles the second stator end-windings and defining a second plurality of holes therein. The first plurality of stator cooling channels extends radially from the stator cooling ring to the first jet ring and the second plurality of stator cooling channels extends radially from the stator cooling ring to the second jet ring. The first embodiment provides the important benefits of improved cooling of not only the stator but also of the stator end windings.

Various optional aspects may apply to the embodiments described herein. These optional aspects may be applied singly, in combination with one another, or in total.

According to a first aspect of the first embodiment, the first jet ring is sandwiched between the housing and the stator to direct cooling oil onto the first stator end-windings and the second jet ring is sandwiched between the housing and the stator to direct cooling oil onto the second stator end-windings. Such sandwiching causes the desired flow of cooling oil onto the end windings.

According to a second aspect of the first embodiment, a first seal resides between the housing and the first jet ring and a second seal between the housing and the second jet ring. With an optional feature of this second aspect of the first embodiment, the first j et ring defines a first groove therein, the first seal defines a first protrusion that is positioned within the first groove, the second jet ring defines a second groove therein, and the second seal defines a second protrusion that is positioned within the second groove.

According to a third aspect of the first embodiment, a third seal resides between a first end of the stator and the first jet ring and a fourth seal resides between a second end of the stator and the second jet ring. With an optional feature of the third aspect of the first embodiment, the first jet ring defines a third groove therein, the second jet ring defines a fourth groove therein, the third seal is positioned within the third groove, and the fourth seal is positioned within the fourth groove.

A method of operation according to a second embodiment of the present disclosure, addresses the operation of an electric drive unit having a housing, a stator within the housing having an outer side surface, including first stator end-windings, and including second stator end-windings. The electric drive unit further includes at least one stator cooling ring that at least partially encircles the outer side surface of the stator, a first jet ring adjacent to and that at least partially encircles the first stator end-windings and that defines a first plurality of holes therein. The electric drive unit further includes a second jet ring adjacent to and that at least partially encircles the second stator end-windings and that defines a second plurality of holes therein. The electric drive unit further includes a first plurality of stator cooling channels extending radially from the stator cooling ring to the first jet ring and a second plurality of stator cooling channels extending radially from the at least one stator cooling ring to the second jet ring.

The method of the second embodiment includes providing oil through an aperture defined in the housing and into the at least one stator cooling ring, providing oil through the stator cooling ring and into the first plurality of stator cooling channels and into the second plurality of stator cooling channels, and providing oil through the first plurality of stator cooling channels and into a first space defined between the housing and the first j et ring. The method further includes providing oil through the second plurality of stator cooling channels and into a second space defined between the housing and the second jet ring. The method finally includes providing oil through the first plurality of holes onto the first stator end-windings and providing oil through the second plurality of holes onto the second stator end-windings.

According to first aspect of the second embodiment, the method further includes providing oil through the first plurality of holes onto the first stator end-windings to a first middle region of the first stator end-windings and providing oil through the second plurality of holes onto the second stator end-windings to a second middle region of the second stator end-windings.

According to a second aspect of the second embodiment, the method further includes providing oil through the first plurality of holes onto the first stator end-windings includes producing a first plurality of pressurized jets and providing oil through the second plurality of holes onto the second stator end-windings includes producing a second plurality of pressurized.

A third embodiment of the present disclosure is directed towards assembling an electric drive unit, the electric drive unit including a housing, a stator wherein the stator defines a first end a second end and an outer side surface and includes first stator end-windings and second stator end-windings, at least one stator cooling ring, a first jet ring defining a plurality of first holes therein, a second jet ring defining a plurality of second holes therein, a first plurality of stator cooling channels, and a second plurality of stator cooling channels. The method of the third embodiment includes positioning the at least one stator cooling ring to at least partially encircle the outer side surface of the stator, positioning the first jet ring adjacent the first stator end-windings and adjacent the first end of the stator, positioning the second jet ring adjacent the second stator end-windings and adjacent the second end of the stator, positioning the first plurality of stator cooling channels to at least partially encircles the outer side surface of the stator and extend from the stator cooling ring to the first jet ring, positioning the second plurality of stator cooling channels to at least partially encircle the outer side surface of the stator and extend from the stator cooling ring to the second jet ring, and positioning the stator, at least one stator cooling ring, first jet ring, second jet ring, first plurality of stator cooling channels and second plurality of stator cooling channels in the housing.

According to a first aspect of the third embodiment, the method includes positioning a first seal between the housing and the first jet ring and positioning a second seal between the housing and the second jet ring. With this first aspect, the first jet ring may define a first groove therein, first seal may define a first protrusion, the second jet ring may define a second groove therein, and the second seal may define a second protrusion with the method further including positioning the first protrusion within the first groove and positioning the second protrusion within the second groove.

According to a second aspect of the third embodiment, the positioning the first seal between the housing and the first jet ring may include compressing the first seal between the housing and the first jet ring and positioning the second seal between the housing and the second jet ring may include compressing the second seal between the housing and the second jet ring.

According to third aspect of the third embodiment, the method may include positioning a third seal between the first end of the stator and the first jet ring and positioning a fourth seal between the second end of the stator and the second jet ring. According to this third aspect, the method may include compressing the third seal between the first end of the stator and the first jet ring and compressing the fourth seal between the second end of the stator and the second jet ring.

BRIEF DESCRIPTION OF THE SEVERAL VIEW OF THE DRAWINGS

FIG. 2 illustrates a perspective view of a portion of an oil distribution system according to a disclosed embodiment.

DETAILED DESCRIPTION OF THE DISCLOSURE

Figure 1A:
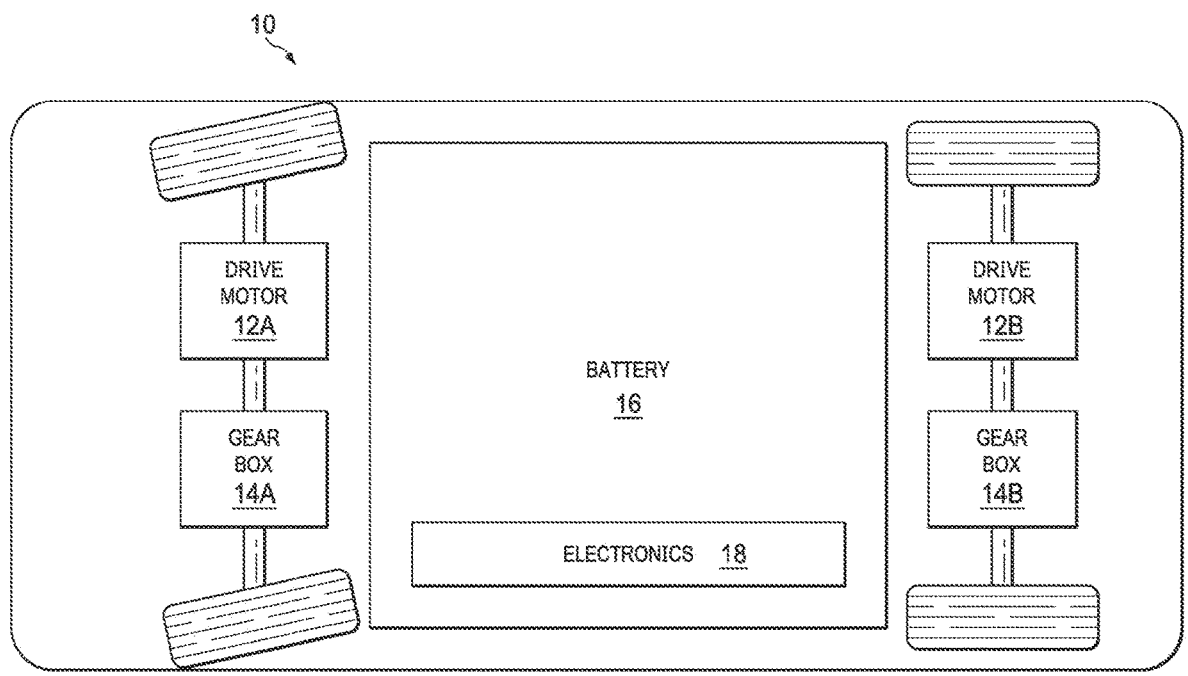
FIG. 1A illustrates the basic components of a battery powered electric vehicle.

FIG. 1A illustrates the basic components of a battery powered electric vehicle (electric vehicle) 10. The electric vehicle 10 includes at least one drive motor (traction motor) 12A and/or 12B, at least one gear box 14A and/or 14B coupled to a corresponding drive motor 12A and/or 12B, a battery 16 and electronics 18 (including drive motor electronics). Generally, the battery 16 provides electricity to the electronics 18 of the electric vehicle 10 and to propel the electric vehicle 10 using the drive motor 12A and/or 12B. The electric vehicle 10 includes a large number of other components that are not described herein but known to one of ordinary skill. While the construct of the electric vehicle 10 of FIG. 1A is shown to have four wheels, differing electric vehicles may have fewer or more than four wheels. Further, differing types of electric vehicles 10 may incorporate the inventive concepts described herein, including motor cycles, aircraft, trucks, boats, train engines, among other types of vehicles.

Various operational issues with the electric vehicle 10 are described herein in conjunction with various embodiments. One of these operational issues relates to the cooling of the drive motor 12A or 12B. Subsequent description herein may relate back to the components of this FIG. 1A. Common numbering may be used to refer to components identified in further FIGS. described herein.

Figure 1B:
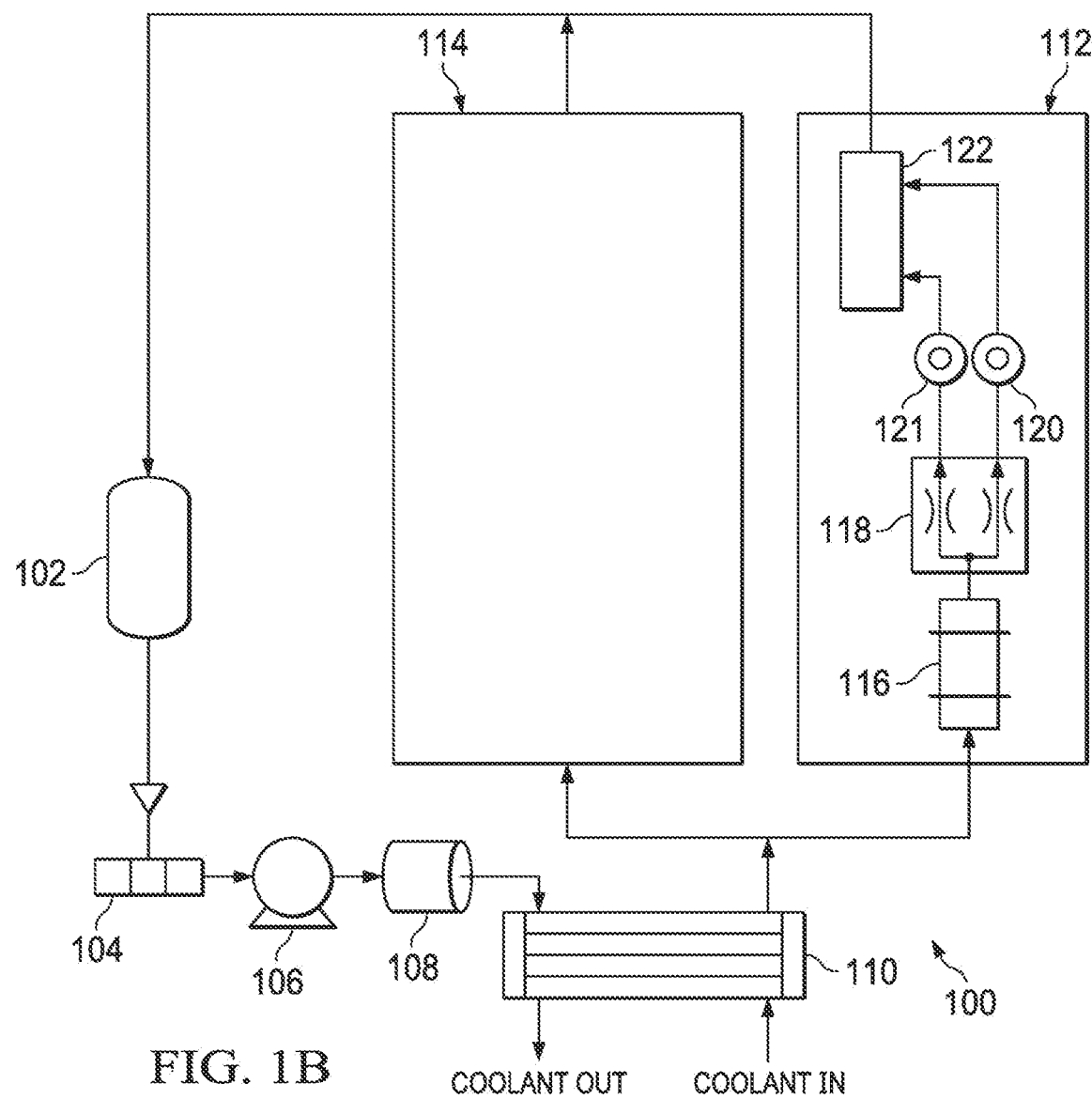
FIG. 1B illustrates a schematic diagram of an oil distribution system according to a disclosed embodiment.

FIG. 1B illustrates a schematic diagram of a cooling and lubrication system 100 according to a disclosed embodiment, which system is used to circulate a fluid, for example oil, though various components of an electric drive unit used in an electric passenger vehicle, for example. Though the embodiments described herein are in the context of a petroleum oil-based system, other fluids could be used. For example, any fluid which provides adequate lubrication, heat transfer and flow properties, for a particular application or pump size, could be used. Starting from oil reservoir 102, which could include a sump or dry sump system (e.g. an oil reservoir external to the drive unit), oil flows through meshed filter 104 to electric pump system 106. Oil pumped out of electric pump system 106 then passes through oil filter 108 and into heat exchanger 110. From heat exchanger 110, the oil then splits between a branch that leads to motor 112 and a branch that leads to gear box 114. For purposes of this description, however, only the oil flowing to motor 112 from heat exchanger 110 is described. Motor 112 could be drive motor 12A or 12B or FIG. 1A. Gear box 114 could be gear box 14A or 14B or FIG. 1A.

With respect to oil flowing to motor 112, it first passes to stator 116 (more specifically, the stator cooling ring thereof), then through stator cooling channels 118 and jet rings 120 and 121, the latter of which spray oil onto stator end-windings 122. The stator cooling ring, stator cooling channels and jet rings, are described in greater detail below. From stator end-windings 122, the oil ultimately drains back to oil reservoir 102. Structure associated with this schematic diagram, a more detailed explanation of the flow of oil therethrough, and a way of assembling a system for implementing the schematic is presented below in conjunction with FIGS. 2-8.

FIG. 2 illustrates a perspective view of a portion of an oil distribution system according to a disclosed embodiment. The portion of the oil distribution system shown therein includes stator cooling ring 200, first stator cooling channels 202, second stator cooling channels 203, first jet ring 120 and second jet ring 121, which collectively encircle a stator (not shown). Though shown as completely encircling the stator in FIG. 2, one of skill in the art will appreciate that stator cooling ring 200, first stator cooling channels 202, second stator cooling channels 203, first jet ring 120 and second jet ring 121 could also only partially encircle stator 116 and still operate. For example, gravity could be relied upon for purposes of cooling lower portions of the end-windings.

Figure 3:
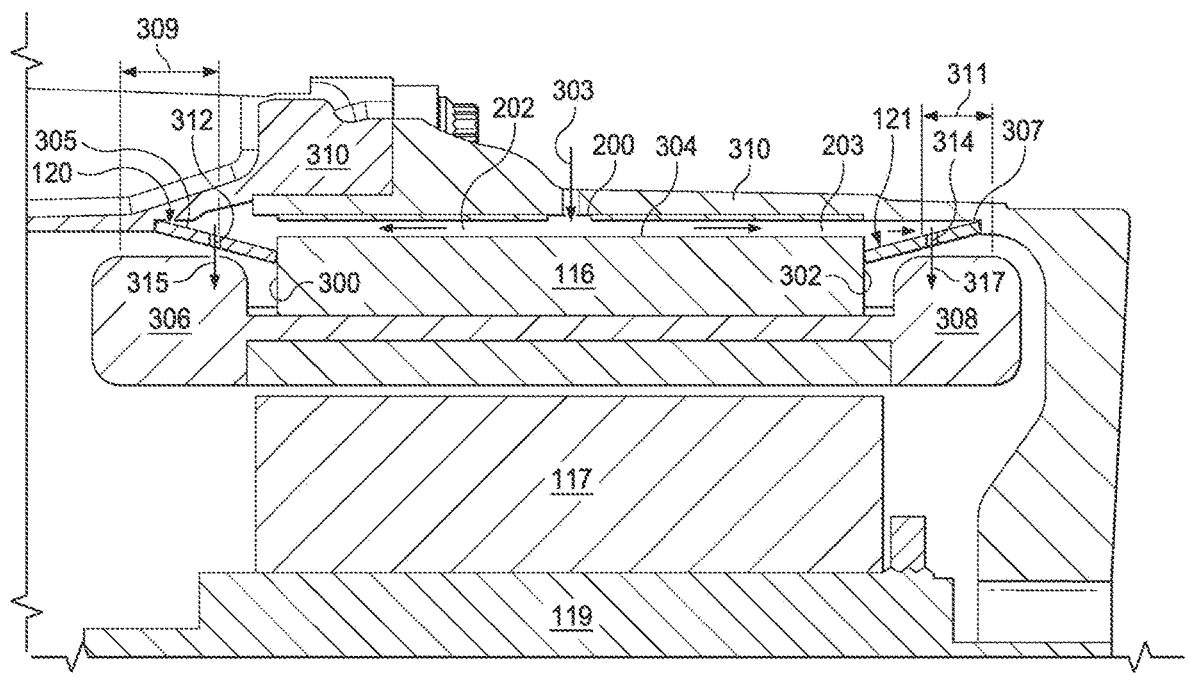
FIG. 3 illustrates a side sectional view of a drive unit according to a disclosed embodiment, in particular showing the flow of oil through stator cooling channels and jet rings.

FIG. 3 shows a side sectional view of a drive unit according to a disclosed embodiment, in particular showing the flow of oil through the stator cooling channels and jet rings thereof. More specifically, FIG. 3 shows stator 116 having a substantially hollow cylindrical shape that surrounds an outer surface of rotor 117 (that attached to rotor shaft 119) and that defines first end 300, second end 302 and side surface 304, and includes first end-windings 306 and second end-winding 308 that extend axially therefrom. To cool first end-windings 306 and second end-windings 308, pressurized oil first flows through aperture 303 in housing 310, and into stator cooling ring 200 encircling stator 116. Thereafter oil flows through first stator cooling channels 202 and second stator cooling channels 203, extending radially from stator cooling ring 200 and substantially parallel to the side surface 304 of stator 116, and into first space 305 and second space 307 defined between housing 310 and first jet ring 120 and second jet ring 121, respectively. Oil then flows through first jet ring 120 and second jet ring 121 onto first end-windings 306 and second end-windings 308 respectively, in particular respective a first middle region 309 and a second middle region 311 thereof. Specifically, oil flows through first jet ring 120 and second jet ring 121 via a first plurality of holes, and a second plurality of holes, defined therein (for example twelve per jet ring). One hole of the first plurality of holes is labelled with reference number 312, and another hole of the second plurality of holes is labelled with reference number 314. Given first jet ring 120 and second jet ring 121 encircle first end-windings 306 and second end-windings 308, respectively, the respective plurality of holes therein can be used to spray pressurized jets of oil from multiple angles and thereby evenly distribute oil to all parts of the respective end-windings. First pressurized jet 315 is shown in conjunction with first jet ring 120, while second pressurized jet 317 is shown in conjunction with second jet ring 121. Though the disclosed embodiment only shows a single stator cooling ring, one of skill in the art will appreciate that more than one such cooling ring could be used, for example, one associated with each of the first stator cooling channels and another associated with the second stator cooling channels. One of skill in the art will also appreciate that housing 310 could be a single unitary piece, or consist of multiple pieces as shown in FIG. 4.

Figure 4A:
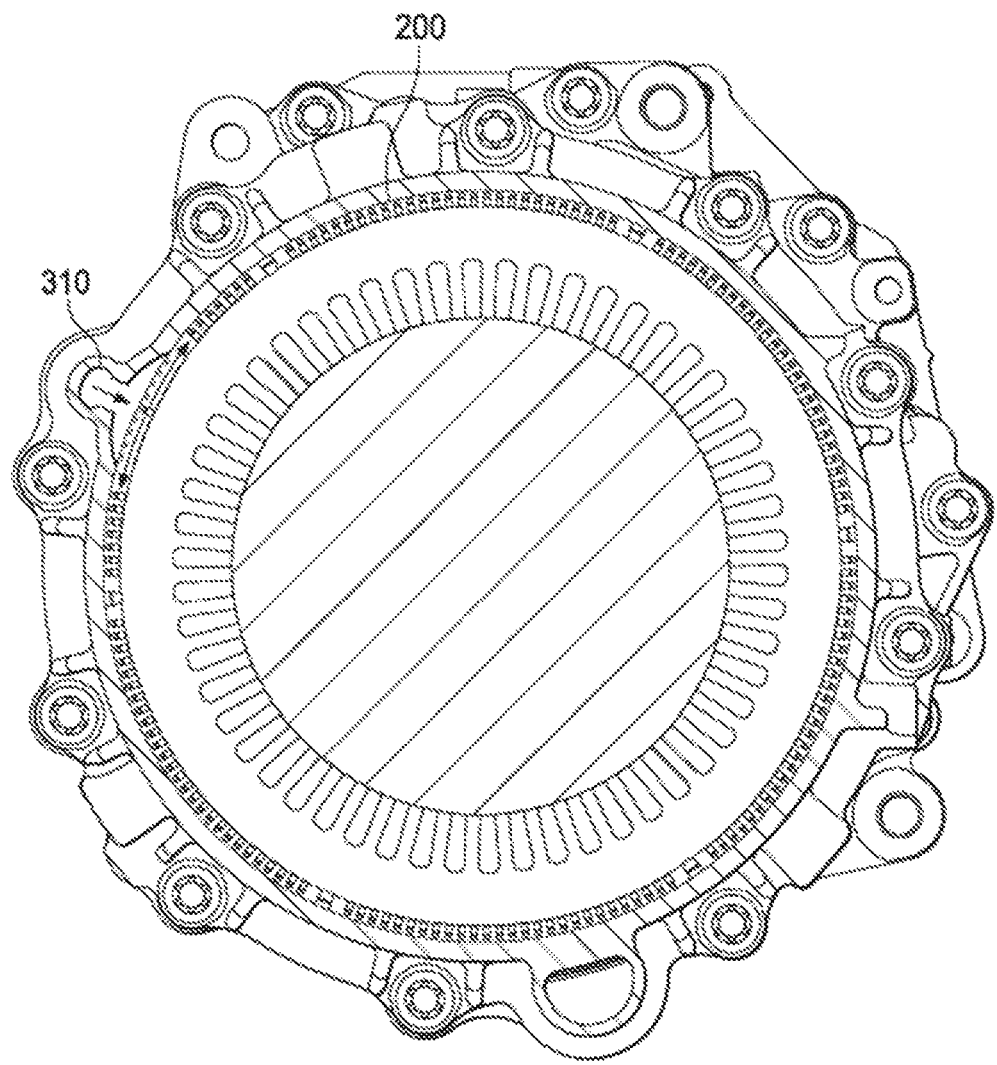
FIGS. 4A and 4B illustrate end sectional views of a drive unit according to disclosed embodiments, in particular showing the flow of oil through a stator cooling ring and a jet ring respectively.
Figure 4B:
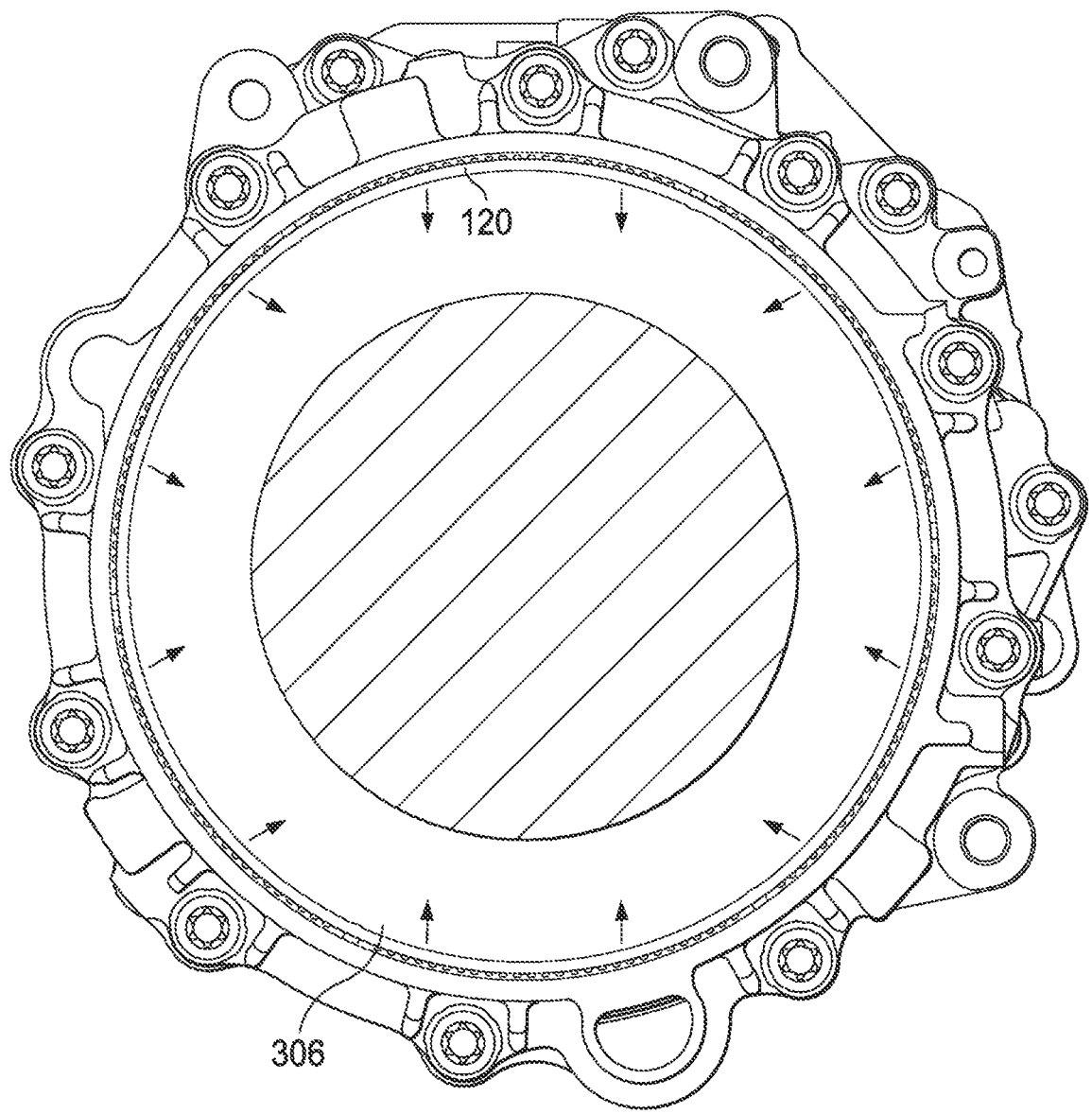

FIGS. 4A and 4B illustrate end sectional views of a drive unit according to disclosed embodiments and in particular showing the flow of oil through a stator cooling ring and a jet ring, respectively. As shown in FIG. 4A, oil (as indicated by arrows) flows through housing 310 and into stator cooling ring 200. As shown in FIG. 4B, oil (as indicated by arrows) flows through jet ring 120 onto first end-windings 306.

Figure 5A:
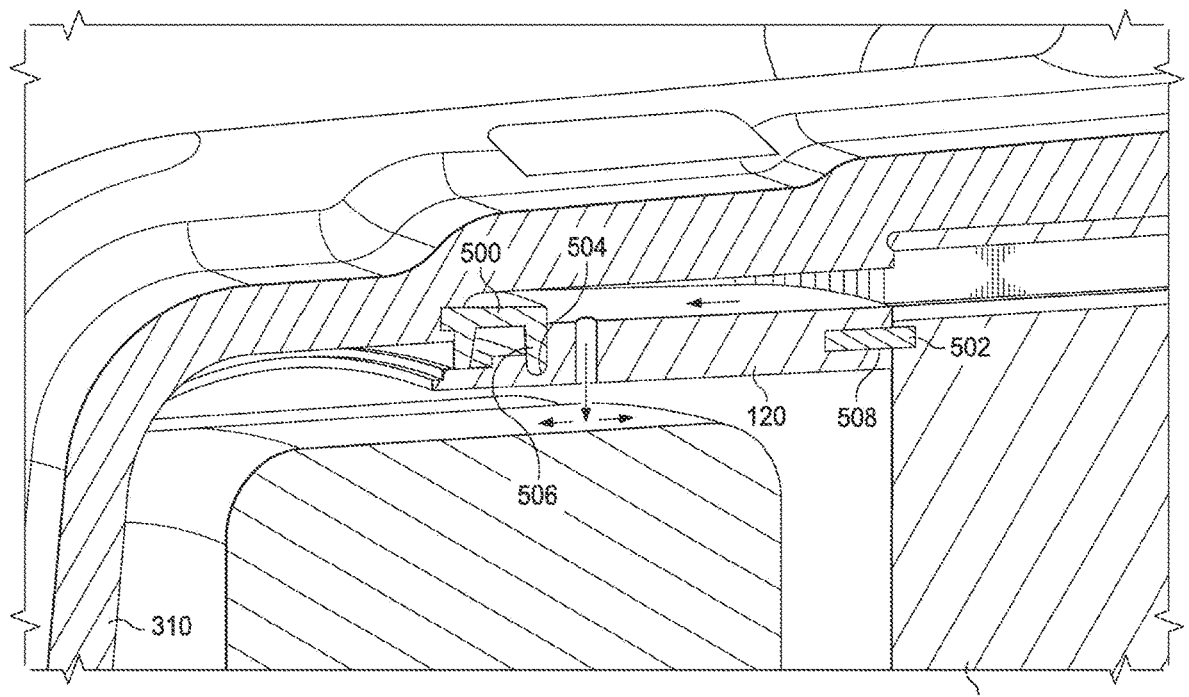
FIGS. 5A and 5B illustrate a perspective side sectional view of an installed jet ring, and an end view of a jet ring having pins therethrough, respectively, according to disclosed embodiments.
Figure 5B:
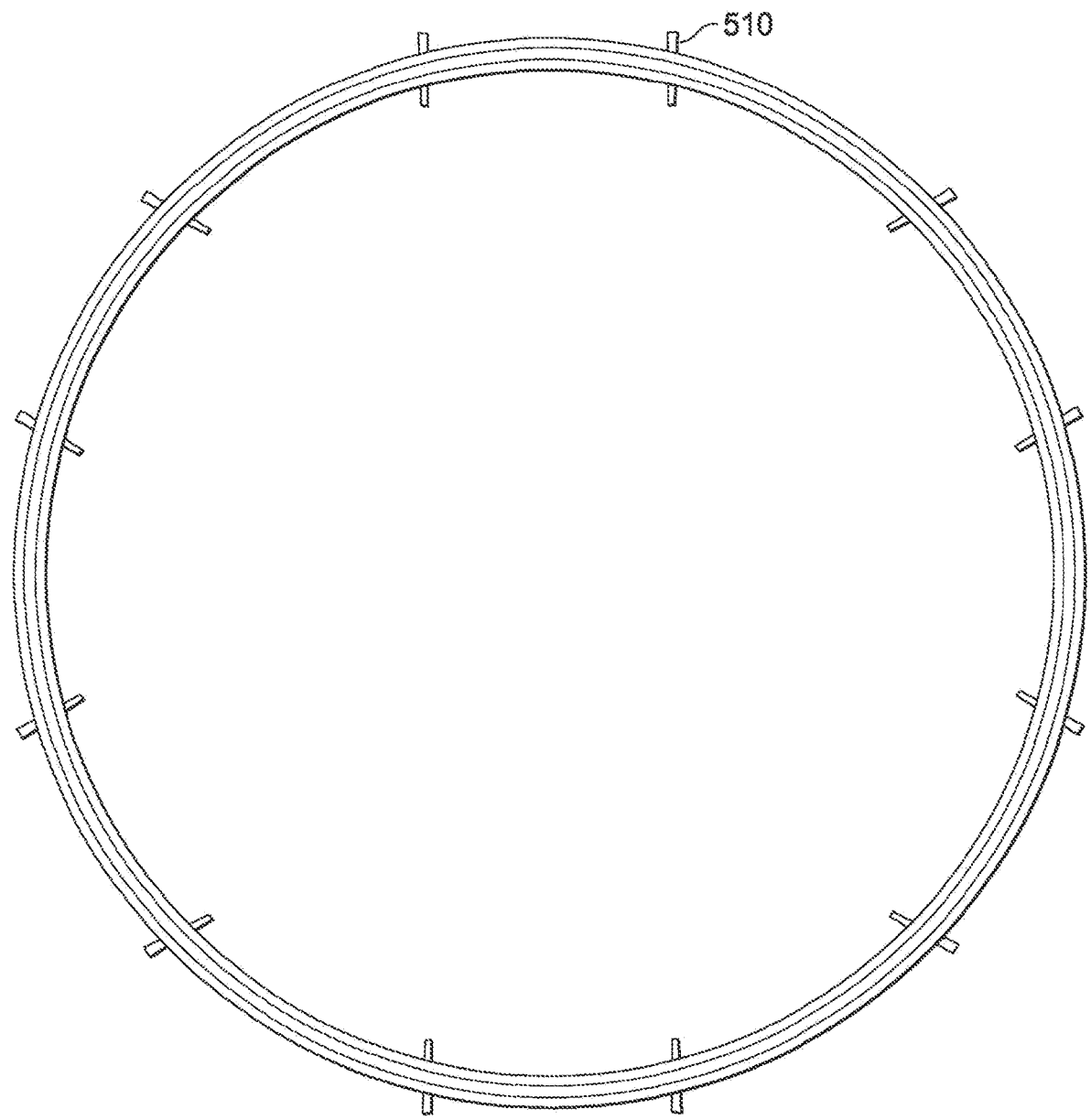

FIGS. 5A and 5B illustrate a perspective side sectional view of an installed jet ring, and an end view of a jet ring, respectively, according to disclosed embodiments. Specifically, FIG. 5A shows first jet ring 120 sealed with respect to housing 310 using first seal 500, and sealed with respect to stator 116 using third seal 502. Similar seals (not shown) may be associated with second jet ring 121 and may be referred to as a second seal and a fourth seal, respectively. More specifically, first jet ring 1120 defines first groove 504 into which first protrusion 506 of first seal 500 is positioned, such that when positioned as shown, first seal 500 is compressed by housing 310 and first jet ring 120 and, as such, in an interference fit therewith. A similar groove and protrusion (not shown) associated with second jet ring 121 and the second seal, respectively, may be referred to as a second groove and second protrusion, respectively. First jet ring 120 further defines third groove 508 into which a portion of third seal 502 is inserted, such that when positioned as shown, third seal 502 is compressed by stator 116 and first jet ring 120, and in an interference fit therewith. A similar groove (not shown) may be defined in second jet ring 121 and may be referred to as a fourth groove.

Using such seals provides for more flexibility when using jet rings in drive units having different form factors, and provides better sealing compared to using a jet ring alone. Such seals may also avoid the leaking of oil to an air gap between stator 116 and housing 310, which leaking can otherwise cause oil to over-heat (which leads to faster degradation of the oil) and increase drag losses in the associated electric drive unit. According to disclosed embodiments first jet ring 120, and second jet ring 121, may be made with plastic or aluminum.

One benefit of such an arrangement is the amount of oil flowing through the jet rings can be easily changed by changing the number and/or size of the holes therein. Similarly, the direction of oil flowing through the jet rings can be easily changed by changing the placement and/or angle of the holes therein. And given the most restrictive path for the oil to flow, in the portion of the oil distribution system described herein, is via the holes in the jet rings, these holes can be used to control the rotor/stator cooling ratio. That is to say, by changing the holes' diameter, and/or the number of holes used, will change this split ratio of oil flowing to stator cooling ring 200 compared to other portions of the oil distribution system, for example for cooling a rotor (not shown) associated with stator 116.

To reduce tooling costs, the jet rings described above may be made using sliders having multiple pins each. As shown in FIG. 5B, for example, in order to make twelve jet holes, six sliders (not shown) having two pins each can be used. One of such pins shown positioned through a jet ring during a manufacturing process is labelled with reference number 510. One benefit of such an approach is that it allows for the split ratio to be changed without having to change a mold for making a jet ring, or having to create a new one.

Figure 6:
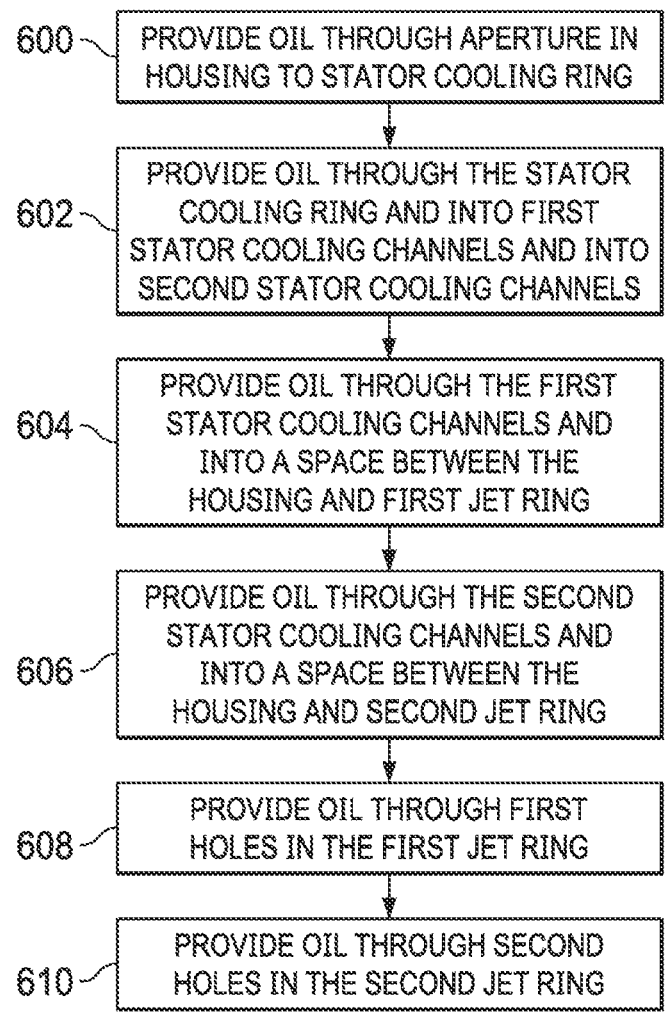
FIG. 6 shows a method of providing cooling and lubrication in a power transmission system according to a disclosed embodiment.

FIG. 6 shows a method of providing cooling and lubrication in a power transmission system according to a disclosed embodiment, which method can use the structure and apparatus disclosed above with respect to FIGS. 1-5. Specifically, a first step 600 is to provide oil through an aperture in the motor housing and into the stator cooling ring. A second step 602 is to provide oil through the stator cooling ring and into the first stator cooling channels and into the second stator cooling channels that extend from the stator cooling ring. A third step 604 is to provide oil through the first stator cooling channels and into the first space between the motor housing and the first jet ring. A fourth step 606 is to provide through the second stator cooling channels and into the second space between the housing and the second jet ring. A fifth step 608 is to provide oil through the first plurality of holes in the first jet ring. A sixth step 610 is to provide oil through the second plurality of holes in a second jet ring. Though written as separate steps, one of skill in the art will appreciate that steps 604 and 606 could occur at the same time, as could steps 608 and 610, respectively.

Figure 7:
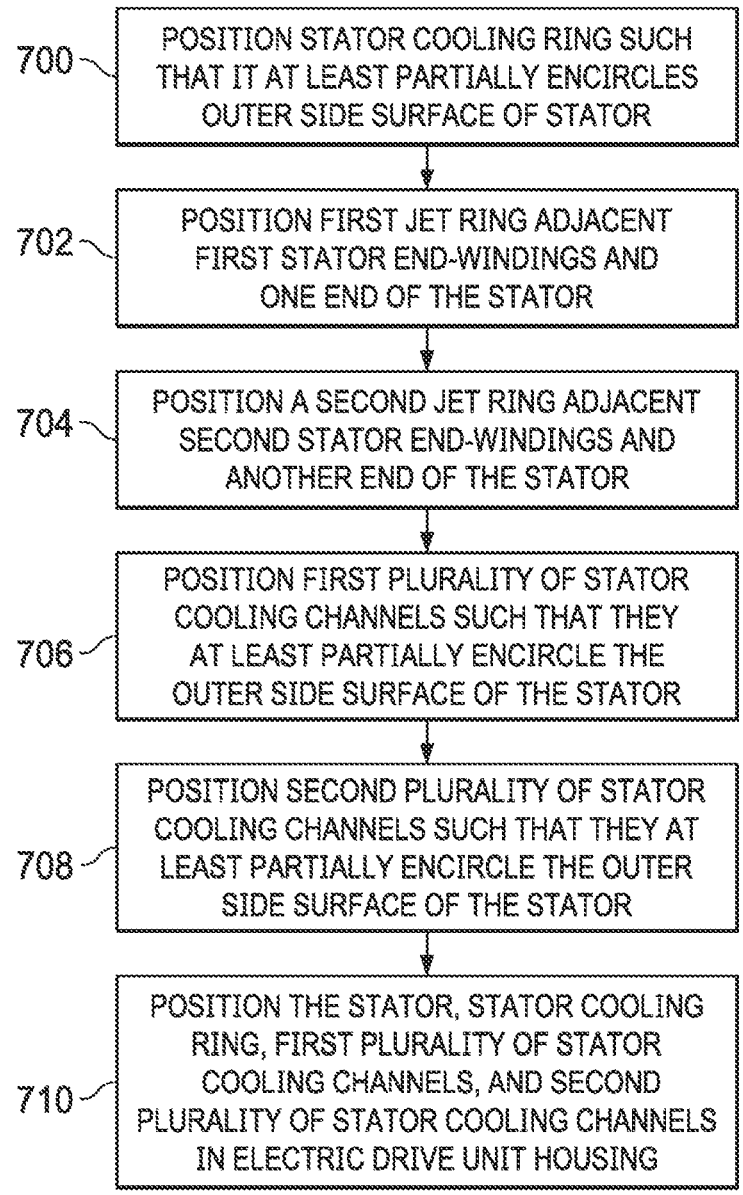
FIG. 7 shows a method of assembling an oil distribution system according to a disclosed embodiment.

FIG. 7 shows a method of assembling an oil distribution system according to a disclosed embodiment, which method can use the structure and apparatus disclosed above with respect to FIGS. 1-5. Specifically, a first step 700 is to position the stator cooling ring such that it at least partially encircles an outer side surface of the stator. A second step 702 is to position the first jet ring adjacent first stator end-windings and one end (e.g. the first end) of the stator. A third step 704 is to position the second jet ring adjacent the second stator end-windings and another end (e.g. the second end) of the stator. A fourth step 706 is to position the first plurality of stator cooling channels, extending from the stator cooling ring to the first jet ring, such that they at least partially encircle the outer side surface of the stator. A fifth step 708 is to position the second plurality of stator cooling channels, extending from the stator cooling ring to the first jet ring, such that they at least partially encircle the outer side surface of the stator. A sixth step 710 is to position, the stator, stator cooling ring, first plurality of stator cooling channels, and second plurality of stator cooling channels in the electric drive unit housing. As one will appreciate, one or more of steps 700-708 could occur at the same time, for example stator cooling ring, the first plurality of stator cooling channels, and the second plurality of stator cooling channels could be pre-assembled and positioned around the stator as a unit.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms comprises, comprising, includes, ""including," "has," "having" or any contextual variants thereof, are intended to cover a nonexclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An electric drive unit of a drive motor for a vehicle comprising:
   a housing of the drive motor;
   a stator within the housing, wherein the stator defines an outer side surface and includes stator end-windings;
   at least one annular stator cooling ring encircling the outer side surface of the stator;
   a first plurality of stator cooling channels and extending radially from the at least one annular stator cooling ring and receiving cooling oil from the at least one annular stator cooling ring;
   a second plurality of stator cooling channels extending radially from the at least one annular stator cooling ring and receiving cooling oil from the at least one annular stator cooling ring,
   wherein an oil distribution assembly including the at least one annular stator cooling ring, the first plurality of stator cooling channels and the second plurality of stator cooling channels is formed as a unit and positioned around the outer side surface of the stator between the stator and the housing, and wherein the oil distribution assembly is separate from the housing and the stator; and
   a plastic annular jet ring interposed between the housing and the stator to direct pressurized cooling oil from the first plurality of stator cooling channels or the second plurality of stator cooling channels through a direct path through a plurality of holes to spray pressurized jets of oil from multiple angles onto the stator end-windings.

2. The electric drive unit of claim 1, wherein the annular jet ring is adjacent to and at least partially encircling the stator end-windings, wherein the jet ring is stationed at a non-parallel angle to the stator cooling channels.

3. The electric drive unit of claim 1, wherein the annular jet ring produces pressurized jets of cooling oil through the plurality of holes onto the stator end- windings.

4. The electric drive unit of claim 1, wherein the first plurality of stator cooling channels extends radially from the at least one annular stator cooling ring to the annular jet ring.

5. The electric drive unit of claim 1, further comprising a seal between the housing and the annular jet ring.

6. The electric drive unit of claim 1, wherein the at least one annular stator cooling ring is independent of the housing and the stator.

7. An electric drive unit of a drive motor for a vehicle comprising:
- a housing of the drive motor;
- a stator within the housing, wherein the stator defines an outer side surface and includes first stator end-windings and second stator end-windings;
- at least one annular stator cooling ring encircling the outer side surface of the stator;
- a first plurality of stator cooling channels extending radially from the at least one annular stator cooling ring to a first plastic annular jet ring, wherein the first plurality of stator cooling channels are configured to receive cooling oil from the at least one annular stator cooling ring and provide the cooling oil to the first plastic annular jet ring; and
- a second plurality of stator cooling channels extending radially from the at least one annular stator cooling ring to a second plastic annular jet ring, wherein the second plurality of stator cooling channels are configured to receive the cooling oil from the at least one annular stator cooling ring and provide the cooling oil to the second plastic annular jet ring,
- wherein an oil distribution assembly including the at least one annular stator cooling ring, the first plurality of stator cooling channels and the second plurality of stator cooling channels is formed as a unit and positioned around the outer side surface of the stator between the stator and the housing, and wherein the oil distribution assembly is separate from the housing and the stator,
- wherein the first plastic annular jet ring is interposed between the housing and the stator to direct pressurized cooling oil through a direct path through a first plurality of holes to spray pressurized jets of oil from multiple angles onto the first stator end-windings,
- wherein the second plastic annular jet ring is interposed between the housing and the stator to direct pressurized cooling oil through a direct path through a second plurality of holes to spray pressurized jets of oil from multiple angles onto the second stator end-windings.

8. The electric drive unit of claim 7, wherein the first plastic annular jet ring is adjacent to, and at least partially encircling the first stator end-windings.

9. The electric drive unit of claim 7, wherein the first plastic annular jet ring produces pressurized jets of cooling oil through the first plurality of holes onto the first stator end-windings.

10. The electric drive unit of claim 7, wherein the second plastic annular jet ring is adjacent to, and at least partially encircling the second stator end-windings and-produces pressurized jets of cooling oil through the second plurality of holes onto the second stator end-windings.

11. The electric drive unit of claim 7, wherein the housing comprises an aperture and wherein the at least one annular stator cooling ring receives cooling oil through the aperture.

12. The electric drive unit of claim 7, wherein the at least one annular stator cooling ring is independent of the housing and the stator.

13. A method of use in an electric drive unit of a drive motor for a vehicle, comprising:
- providing oil through an aperture defined in a housing of the electric drive unit for the drive motor, wherein the oil flows into an annular stator cooling ring of a unitary oil distribution assembly;
- providing oil through the annular stator cooling ring and into a first plurality of stator cooling channels and into a second plurality of stator cooling channels;
- allowing the oil to flow within the stator cooling ring and through the first plurality of stator cooling channels and into a first space defined between the housing and a first plastic annular jet ring having a first plurality of holes;
- allowing the oil to flow within the stator cooling ring and through the second plurality of stator cooling channels and into a second space defined between the housing and a second plastic annular jet ring having a second plurality of holes;
- providing oil through the first plurality of holes to spray pressurized jets of oil from multiple angles onto first stator end-windings of a stator within the housing; and
- providing oil through the second plurality of holes to spray pressurized jets of oil from multiple angles onto second stator end-windings of the stator,
- wherein an oil path from the aperture to the stator end windings through the plurality of holes in the first plastic annular jet ring and the second plastic annular jet ring is direct.

14. The method of claim 13, further comprising providing oil to a first middle region of the first stator end-windings.

15. The method of claim 14 further comprising providing oil through the second plurality of holes onto the second stator end-windings includes providing oil to a second middle region of the second stator end-windings.

16. The method of claim 13, wherein providing oil through the first plurality of holes of the first plastic annular jet ring onto the first stator end-windings includes producing a first plurality of pressurized jets of the oil directly and orthogonally onto the first stator end-windings.

17. The method of claim 16, wherein providing oil through the second plurality of holes of the second plastic annular jet ring onto the second stator end-windings includes producing a second plurality of pressurized jets of the oil directly and orthogonally onto the second stator end-windings.

18. A method of assembling an electric drive unit of a drive motor for a vehicle, the electric drive unit including a housing of the drive motor, a stator wherein the stator defines a first end, a second end and an outer side surface and includes first stator end-windings and second stator end-windings, at least one annular stator cooling ring, a first plurality of stator cooling channels, and a second plurality of stator cooling channels, the method comprising:
- positioning the at least one annular stator cooling ring to encircle the outer side surface of the stator;
- positioning a first plastic annular jet ring having a first plurality of holes adjacent the first stator end-windings and adjacent the first end of the stator;
- positioning a second plastic annular jet ring having a second plurality of holes adjacent the second stator end-windings and adjacent the second end of the stator;
- positioning the first plurality of stator cooling channels to at least partially encircle the outer side surface of the stator and extend within the stator cooling ring from the at least one annular stator cooling ring to the first plastic annular jet ring, wherein the first plurality of stator cooling channels receives cooling oil from the at least one annular stator cooling ring and provides the cooling oil to the first plastic annular jet ring;

positioning the second plurality of stator cooling channels to at least partially encircle the outer side surface of the stator and extend within the stator cooling ring from the at least one annular stator cooling ring to the second plastic annular jet ring, wherein the second plurality of stator cooling channels receives the cooling oil from the at least one annular stator cooling ring and provides the cooling oil to the second plastic annular jet ring; and positioning the stator, at least one annular stator cooling ring, first plastic annular jet ring, second plastic annular jet ring, first plurality of stator cooling channels and second plurality of stator cooling channels in the housing, wherein an oil distribution assembly including the at least one annular stator cooling ring, the first plurality of stator cooling channels and the second plurality of stator cooling channels is formed as a unit between the stator and the housing and is separate from the housing and the stator, wherein a first oil path directs pressurized cooling oil to spray pressurized jets of oil from multiple angles onto the first stator end windings through the first plurality of holes in the first plastic annular jet ring and a second oil path directs pressurized cooling oil to spray pressurized jets of oil from multiple angles onto the second stator end windings through the second plurality of holes in the second plastic annular jet ring.

19. The method of claim 18, further comprising positioning a first seal between the housing and the first plastic annular jet ring and positioning a second seal between the housing and the second plastic annular jet ring.

20. The method of claim 18, wherein the at least one annular stator cooling ring is independent of the housing and the stator.

21. The method of claim 18, further comprising positioning the first plastic annular jet ring at a non-orthogonal angle to the first stator cooling channels, and positioning the second plastic annular jet ring at a non-orthogonal angle to the second stator cooling channels.

22. The method of claim 18, additionally comprising producing first pressurized jets onto the first stator end-windings through the first plurality of holes and producing second pressurized jets onto the second stator end-windings through the second plurality of holes.

23. The method of claim 18, additionally comprising providing an aperture connected to the at least one annular stator cooling ring and configured to provide cooling oil to the at least one annular stator cooling ring.

* * * * *